E. B. CANTRELL AND G. E. MILLER.

OIL RETAINER.

APPLICATION FILED NOV 10, 1920.

Reissued Mar. 15, 1921. 15,061.

WITNESS

H. A. Sherburne,

INVENTORS

EDWIN B. CANTRELL

GEORGE E. MILLER.

BY

White, Pirst & Evans.

their ATTORNEYS

UNITED STATES PATENT OFFICE.

EDWIN B. CANTRELL, OF SAN FRANCISCO, AND GEORGE EDWARD MILLER, OF OAKLAND, CALIFORNIA, ASSIGNORS TO CANTRELL-MILLER MANUFACTURING COMPANY, OF SAN FRANCISCO, CALIFORNIA, A CORPORATION OF CALIFORNIA.

OIL-RETAINER.

15,061. Specification of Reissued Letters Patent. Reissued Mar. 15, 1921.

Original No. 1,291,397, dated January 14, 1919, Serial No. 189,788, filed September 5, 1917. Application for reissue filed November 10, 1920. Serial No. 423,197.

*To all whom it may concern:*

Be it known that we, EDWIN B. CANTRELL and GEORGE E. MILLER, citizens of the United States, respectively residing in the city and county of San Francisco, and Oakland, county of Alameda, State of California, have invented new and useful Improvements in Oil-Retainers, of which the following is a specification.

The invention relates to an oil retainer, and particularly to improvements on the oil-retainer shown in our former Patent No. 1,057,656, issued April 1st, 1913, and also improvements in the oil-retainer shown in Patent No. 1,291,397, issued January 14, 1919.

One of the objects of the present invention is to provide a simple, cheaply manufactured, easily applied packing member to be used in connection with axle housings on automobiles, gear housings and bearings in general through which a shaft or axle extends and which are generally filled with a lubricant that has a tendency to leak or escape around the axle. Another object of the invention is to provide a novel form of expansible washer for securing the packing member in place and locking it against turning movement with relation to the shaft and housing in which it is inserted.

In this connection it is an important object to provide a method for positioning and effectually securing the expansible device in its place, and, also for forming a hermetic seal at the seat on which the device is placed. Further objects will hereinafter appear.

The invention consists of the parts and the construction and combination of parts as hereinafter more fully described and claimed, having reference to the accompanying drawings, in which—

Figure 3:
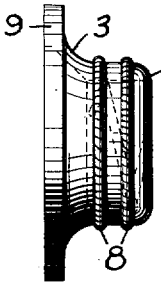
Fig. 3 is a side elevation of the oil-retainer.
Figure 4:
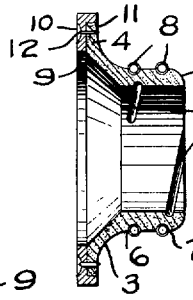
Fig. 4 is a central, vertical section through same.
Figure 5:
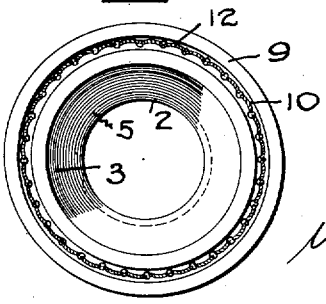
Fig. 5 is an end view of the retainer.

The oil retainer forming the subject-matter of the present application is constructed of a leather disk or diaphragm which is placed between two die members and pressed or shaped substantially as shown in Figs. 3, 4 and 5. The retainer consists of a sleeve or boot portion 2, a conical portion 3, and a circumferential flange 4.

Formed interiorly of the sleeve portion 2 is a helical oil removing groove 5, and formed exteriorly of the sleeve are circumferential grooves 6 and 7 which are provided for the reception of a pair of coil spring rings 8. Adapted to be attached to the flange 4 of the retainer is a ductile washer 9. One face of this washer, which may be of lead, is provided with an annular, concaved recess 10, while the opposite face is provided with an annular shoulder 11 which forms an exterior seat for the reception of the flange 4 of the member 2. The flange may be secured to the lead washer in any suitable manner, but preferably by perforating the washer and sewing the flange thereto by thread, wire or other suitable material, as shown at 12. The annular recess 10 is sufficiently depressed to receive the thread 12, thereby keeping it out of contact with any exterior member which might have a tendency to contact with and wear away the thread.

Figure 2:
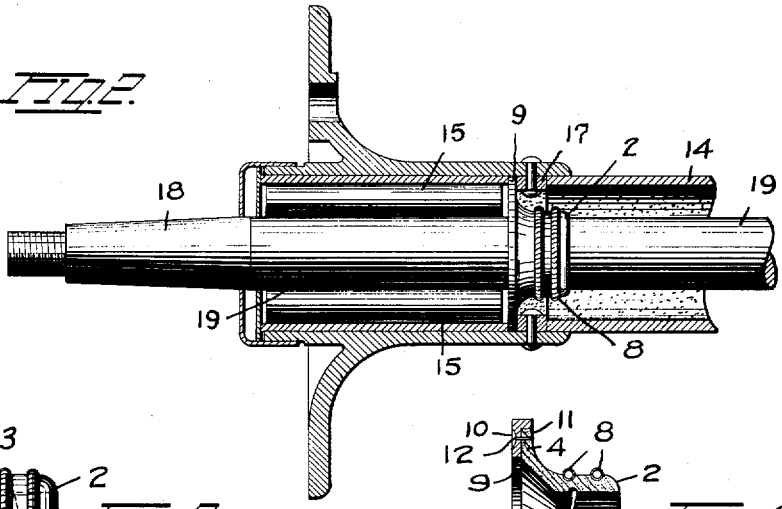
Fig. 2 is a similar view, showing the packing member and a washer in place.

The present oil-retainer is particularly constructed for use in connection with an axle housing 14, such as is employed on "Ford" and like automobiles, and when inserted or placed in position it assumes the position shown in Fig. 2. For the purpose of getting the best result when inserting the retainer here shown, it is first necessary to remove the roller bearing 15 and the bearing sleeve 16, together with all packing waste or obstructions that might be in the housing. All burs or rough edges should then be filed off of the axle in the vicinity of the retainer which may then be inserted endwise until it engages the end of the axle housing shown at 17.

Figure 1:
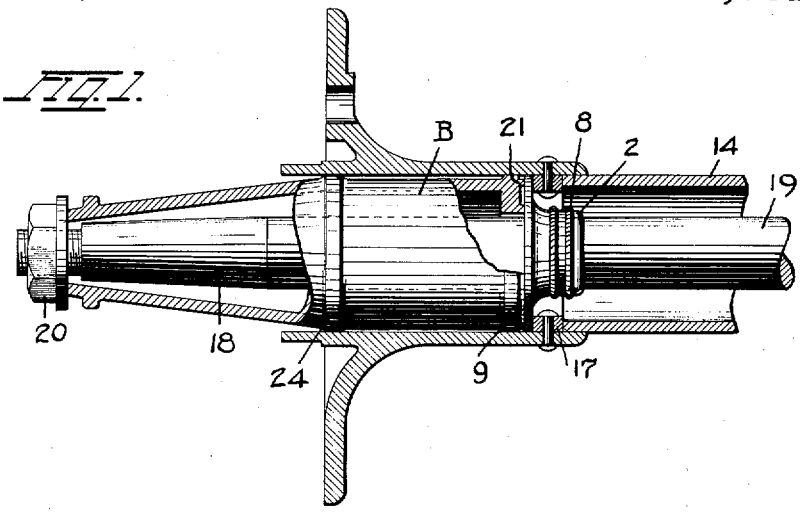
Figure 1 is a central, longitudinal section through an axle housing, showing a suitable form of tool for inserting the packing member and expanding the packing washer.

A special form of tool, generally indicated at B, is then slipped over the spindle 18 and the axle 19, as shown in Fig. 1, and the nut 20 is screwed up against the end of the tool or washer placed in front of same. Tightening up of the screw forces the tool inwardly against the lead washer and as the forward face of the tool is provided with an annular projection, which is approximately V-shaped in cross section, as shown at 21, it can readily be seen that it will force the lead washer tightly up against the end of the axle housing and will also expand the washer radially or circumferentially to such an extent that it will be tightly locked within the bearing. The pressure of the tool against the washer will also force the annular shoulder 11 of the washer into any depression in the end of the axle housing and thus form a tight joint between the faces and also between the inner surface of the bearing and the peripheral surface of the washer.

The tool may then be removed and the bearing sleeve 16, together with the roller bearing 15, replaced; the replacing of the bearing sleeve being materially assisted by reversing the position of the tool B to permit the shoulder 24 to engage the end of the bearing sleeve when the nut 20 is applied. The bearing sleeve may, therefore, be forced into position by screw pressure and its inner end may be embedded in the face of the washer, thus further locking it against circumferential movement.

The axle housing 14 may in this instance be filled with a heavy oil in preference to a grease and no leakage will take place between the axle and the roller bearing as the spring rings 8, surrounding the sleeve 2 of the retainer, will retain this so tight around the revolving shaft that leakage or escape of oil at this point is practically obviated, any leakage which might occur being positively prevented by providing the groove 5 which returns any oil which might have a tendency to leak.

The retainers as a whole are substantially duplicate in construction and are therefore standardized and interchangeable. However, as they may be used on right and left hand ends of a shaft it is desirable that the helical grooves 5 be of right hand pitch in some retainers and of left hand pitch in others so that when applied the rotation of the shaft will cause the lubricant to flow inwardly through the grooves 5 rather than outwardly; the retainers, it being remembered, remaining stationary.

The retainer as a whole is simple and substantial in construction and can be easily applied wherever required and may always be locked and sealed in place by the lead washer provided. That is, the expansion of the gasket radially, when it is forced into place, produces a seal around the periphery of the retainer through which the oil cannot leak, and simultaneously locks it in place, as previously described.

It is very desirable that the sleeve 2 and its flange 4 be connected by a substantially impervious but pliant diaphragm-like, connecting portion 3, so that the relatively moving casing and the shaft might freely vibrate without disrupting the joint of the seal. While leather is mentioned other pliant material may be utilized.

While the retainer has here been described and shown as used in connection with an axle housing, it is obvious that many other applications or uses for a device of this character may be found and that the parts comprising the same may be varied as the experience and judgment of the manufacturer may dictate.

What is claimed is:

1. An oil retainer composed of a soft metal washer having a circular depression on its front face and having a circular shoulder extending outwardly from its rear face, a fibrous sleeve-like member having one end flared and engaging the rear face of the washer and said shoulder so as to be held by the latter against movement radially of the washer, said washer having perforations extending through its rear face and through said depression, and means for securing the member to the washer extending through said perforations and lying within the depression so as to be protected by the latter.

2. An oil retainer composed of a metal washer having a circular shoulder extending outwardly from its rear face and spaced from the inner circumference of the washer, a fibrous sleeve-like member having one end flared and engaging the rear face of the washer and having its periphery engaging said shoulder, and means extending through the washer and said flared part of said member to secure the member to the washer.

3. In an oil retainer for axle housings, a soft metal washer having a shoulder extending outwardly from its rear face, a fibrous sleeve-like member having one end flared and engaging the rear face of the washer and said shoulder, and means to secure the member to the washer so as to enable the latter to be expanded by an extraneous force so as to expand the washer radially and to also expand the shoulder to form a close fit with the end of the axle housing and with the flared end of the member.

4. In an oil retainer for axle housings, a washer, a fibrous sleeve-like member having one end flared and engaging the rear face of the washer, and means to secure the member to the washer whereby to allow force extraneous to said securing means to be applied to the front face of the washer so as to expand the washer radially and against the end of the axle housing to form a tight fit therewith.

5. As an article of manufacture, a pliant, liquid proof diaphragm-like member having an elongated, central, contractile sleeve to embrace a part to be packed, said sleeve having a helical groove for returning oil tending to pass within the sleeve at its bearing on said part.

6. As an article of manufacture, a pliant, liquid proof diaphragm-like member having an elongated, central, contractile sleeve to embrace a part to be packed, said sleeve having a helical groove for returning oil tending to pass within the sleeve at its bearing on said part, and contractive means embracing the sleeve to compress it about the said part.

7. Means for packing a chamber adapted to contain a fluid, comprising a pliant diaphragm-like structure to be supported at its periphery by a contiguous annular surface of the chamber, and having an elongated cylindrical contractile sleeve portion to circumferentially embrace an element extending therethrough, the sleeve being circumferentially grooved, and contractile spring-means mounted in the grooves to compress the sleeve centripetally.

8. An oil retaining means including a pliant diaphragm having a sleeve extending from one side, and a ductile ring secured to the peripheral portion of the diaphragm and adapted to be expressed into secure position on a contiguous support.

9. An oil retaining means including a pliant diaphragm having a sleeve extending from one side, and a ductile ring secured to the peripheral portion of the diaphragm and adapted to be expressed into secure position on a contiguous support and form therewith a tight, leak-proof joint.

10. An oil retaining means including a pliant diaphragm having an elongated contractile sleeve extending from one side, and a ductile ring secured to the peripheral portion of the diaphragm and adapted to be expressed into secure position on a contiguous support.

11. An oil retainer including a ductile ring adapted to be expressed into holding contact with a surrounding and contiguous surface, and a pliant, frusto-conoidal ring, adapted to embrace a running part, secured to the ductile ring and held in place by the expansion of the ring.

12. The method of mounting a diaphragm-like element in its casing so as to secure it which consists of applying and securing to the peripheral portion of the element a ductile ring, inserting the device into the casing to position, and then applying pressure to the marginal portion of the ductile ring so that this is expanded into firm and holding contact with the contiguous surface.

13. The method of mounting a diaphragm-like element in its casing so as to secure it and, at the same time, obtain a leak tight joint, which consists of applying and securing to the peripheral portion of the element a ductile ring, inserting the device into the casing to position, and then applying pressure to the marginal portion of the ductile ring so that this is expanded into firm and holding contact with the contiguous surface.

In testimony whereof we have set our hands.

EDWIN B. CANTRELL.
GEORGE EDWARD MILLER.